(12) United States Patent
Smit et al.

(10) Patent No.: US 11,592,454 B2
(45) Date of Patent: Feb. 28, 2023

(54) METHOD OF HANDLING LABORATORY SAMPLE CONTAINERS BY A LABORATORY SAMPLE CONTAINER HANDLING SYSTEM, A LABORATORY SAMPLE CONTAINER HANDLING SYSTEM, AND A LABORATORY AUTOMATION SYSTEM

(71) Applicant: Roche Diagnostics Operations, Inc., Indianapolis, IN (US)

(72) Inventors: Werner Smit, Hagendorn (CH); Florian Weber, Haslen (CH); Bauke Sjoerd Hollander, Zurich (CH); Riccardo Triunfo, Zug (CH); Chye Yin Priscillia Tan, Bach (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 311 days.

(21) Appl. No.: 16/910,579

(22) Filed: Jun. 24, 2020

(65) Prior Publication Data

US 2020/0408790 A1 Dec. 31, 2020

(30) Foreign Application Priority Data

Jun. 28, 2019 (EP) .................................. 19183386

(51) Int. Cl.
*G01N 35/00* (2006.01)
(52) U.S. Cl.
CPC .............. *G01N 35/00732* (2013.01); *G01N 2035/00752* (2013.01); *G01N 2035/00861* (2013.01)
(58) Field of Classification Search
CPC ... G01N 35/00732; G01N 2035/00752; G01N 2035/00861
USPC .......................................................... 73/863
See application file for complete search history.

(56) References Cited

U.S. PATENT DOCUMENTS

| | | | | |
|---|---|---|---|---|
| 11,176,154 B1 * | 11/2021 | Dasgupta | ............. | G06K 9/6253 |
| 11,354,679 B1 * | 6/2022 | Morgan | ............. | G06Q 30/0283 |
| 2005/0058574 A1 | 3/2005 | Bysouth et al. | | |
| 2012/0025985 A1 | 2/2012 | Bolander et al. | | |
| 2014/0143212 A1 * | 5/2014 | Shumay | ................ | G06F 16/437 |
| | | | | 707/E17.044 |
| 2015/0199853 A1 * | 7/2015 | Bentley | .................. | G06Q 10/08 |
| | | | | 382/101 |
| 2015/0288760 A1 * | 10/2015 | Thomas | .............. | H04L 67/1095 |
| | | | | 709/203 |
| 2017/0234778 A1 * | 8/2017 | Sangha | .................... | G01N 1/31 |
| | | | | 435/6.11 |
| 2018/0156835 A1 | 6/2018 | Hassan | | |
| 2019/0251506 A1 * | 8/2019 | Swartz | .................. | G06F 16/219 |
| 2019/0378092 A1 * | 12/2019 | Alexander | ......... | G06Q 10/1053 |
| 2020/0036685 A1 * | 1/2020 | Liu | .......................... | H04L 67/01 |
| 2020/0374359 A1 * | 11/2020 | Kononyuk | ............ | H04L 67/565 |
| 2020/0408790 A1 * | 12/2020 | Smit | ........................ | B01L 3/545 |
| 2021/0056110 A1 * | 2/2021 | Bong | .................. | G06F 16/1873 |
| 2021/0287202 A1 * | 9/2021 | Fowler | ............... | G06Q 20/3276 |
| 2021/0335501 A1 * | 10/2021 | Rajagopal | .............. | G16H 50/50 |
| 2021/0407490 A1 * | 12/2021 | Cardoso | .......... | G10K 11/17823 |
| 2022/0163538 A1 * | 5/2022 | Adams | ............... | G01N 33/6893 |
| 2022/0193027 A1 * | 6/2022 | Moore | .............. | G06Q 30/0208 |

FOREIGN PATENT DOCUMENTS

| CN | 105550725 A | 5/2016 |
|---|---|---|
| EP | 0342730 A2 | 11/1989 |
| WO | 2017/157784 A1 | 9/2017 |

OTHER PUBLICATIONS ip.com search.*

* cited by examiner

*Primary Examiner* — Allyson N Trail
(74) *Attorney, Agent, or Firm* — Roche Diagnostics Operations, Inc.

(57) ABSTRACT

A method of handling laboratory sample containers by a laboratory sample container handling system is presented. The method comprises providing a laboratory sample container comprising an assigned ID information to the laboratory sample container handling system, reading the assigned ID information, checking, if the read ID information is unique or not unique within the laboratory sample container handling system, and if the read ID information (2) is not unique within the laboratory sample container handling system, assigning a new ID information to the laboratory sample container. The new ID information is unique within the laboratory sample container handling system.

15 Claims, 1 Drawing Sheet

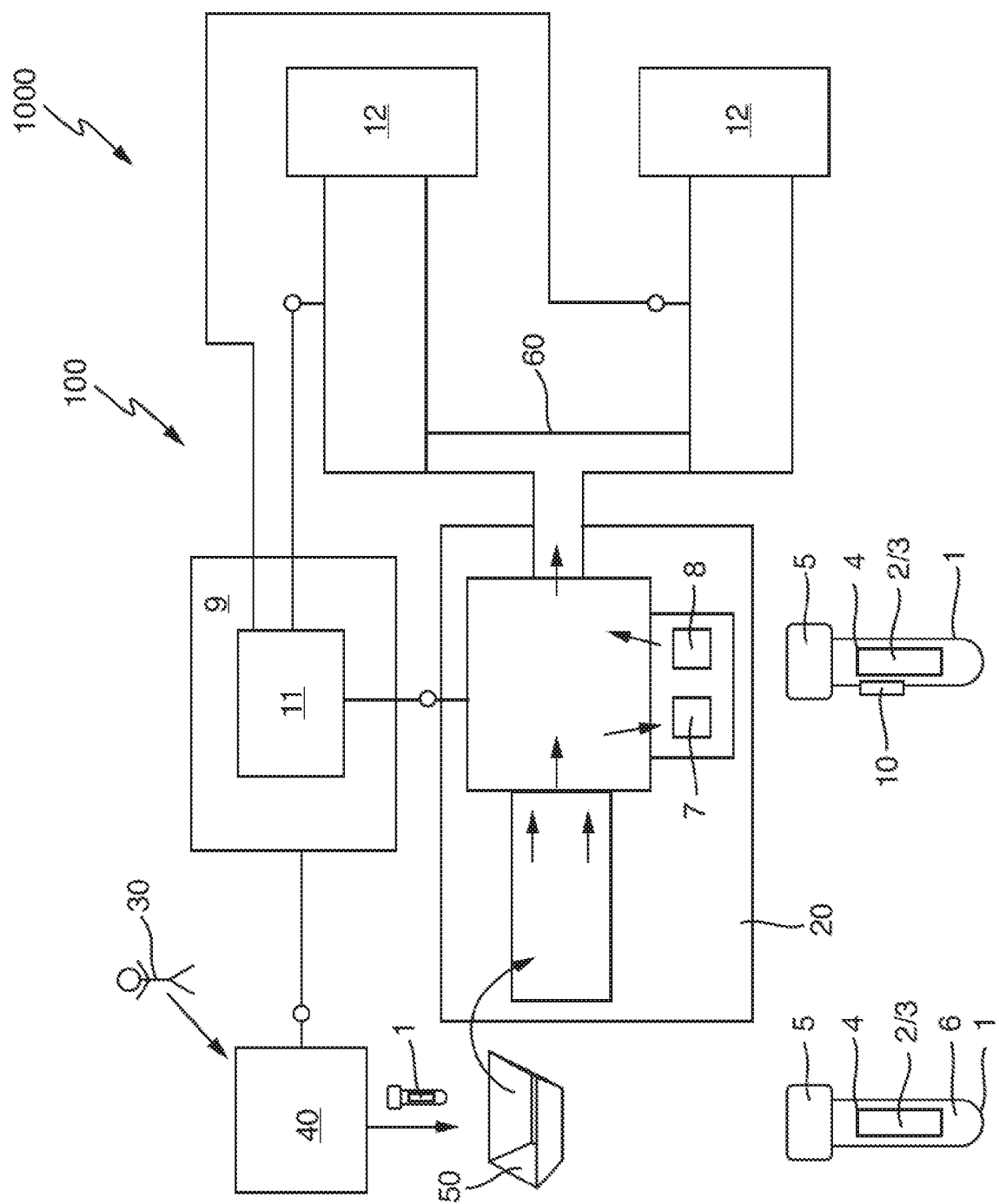

METHOD OF HANDLING LABORATORY SAMPLE CONTAINERS BY A LABORATORY SAMPLE CONTAINER HANDLING SYSTEM, A LABORATORY SAMPLE CONTAINER HANDLING SYSTEM, AND A LABORATORY AUTOMATION SYSTEM

CROSS-REFERENCE TO RELATED APPLICATIONS

This application claims priority to EP 19183386.2, filed Jun. 28, 2019, which is hereby incorporated by reference.

BACKGROUND

The present disclosure generally relates to a method of handling laboratory sample containers by a laboratory sample container handling system, to a laboratory sample container handling system and to a laboratory automation system.

There is a need to provide for a method of handling laboratory sample containers by a laboratory sample container handling system, a laboratory sample container handling system and a laboratory automation system that is highly flexible and performant.

SUMMARY

According to the present disclosure, a method of handling laboratory sample containers by a laboratory sample container handling system is presented. The method can comprise providing a laboratory sample container comprising an assigned ID information to the laboratory sample container handling system, reading the assigned ID information, checking if the read ID information is unique or not unique within the laboratory sample container handling system, and, if the read ID information is not unique within the laboratory sample container handling system, assigning a new ID information to the laboratory sample container. The new ID information can be unique within the laboratory sample container handling system.

Accordingly, it is a feature of the embodiments of the present disclosure to provide for a method of handling laboratory sample containers by a laboratory sample container handling system, a laboratory sample container handling system and a laboratory automation system that is highly flexible and performant. Other features of the embodiments of the present disclosure will be apparent in light of the description of the disclosure embodied herein.

BRIEF DESCRIPTION OF THE SEVERAL VIEWS OF THE DRAWING

The following detailed description of specific embodiments of the present disclosure can be best understood when read in conjunction with the following drawing, where like structure is indicated with like reference numerals and in which:

FIG. 1 illustrates schematically a laboratory automation system comprising an inventive laboratory sample container handling system according to an embodiment of the present disclosure.

DETAILED DESCRIPTION

In the following detailed description of the embodiments, reference is made to the accompanying drawing that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The method of handling laboratory sample containers by a laboratory sample container handling system is presented. The method can comprise, manually or automatically, providing a laboratory sample container comprising an assigned ID information to the laboratory sample container handling system. The laboratory sample container may, for example, be embodied as a conventional laboratory sample tube. After the laboratory sample container has been provided, the assigned ID information can be read, for example, by a barcode reader, a RFID reader, a camera, and the like. Then it can be checked if the read ID information is unique or not unique within the laboratory sample container handling system.

If the read ID information is unique, the ID information can remain unchanged and the laboratory sample container and/or a laboratory sample contained in the laboratory sample container may be further processed based on the original ID information.

If the read ID information is not unique within the laboratory sample container handling system, a new ID information can be assigned to the laboratory sample container. The new ID information can be unique within the laboratory sample container handling system.

According to an embodiment, the ID information can be embodied as a barcode printed on a label attached to the laboratory sample container. Assigning the new ID information to the laboratory sample container can be performed by attaching a new label to the laboratory sample container. A barcode representing the new ID information can be printed on the new label.

According to an embodiment, additionally or alternatively, the ID information can be embodied as a value stored in a RFID tag attached to the laboratory sample container. Assigning the new ID information to the laboratory sample container can be performed by overwriting the old value by the new ID information.

According to an embodiment, the laboratory sample container and/or the laboratory sample contained in the laboratory sample container can be further processed after the new ID information has been assigned to the laboratory sample container based on the new ID information.

According to an embodiment, a cap, if any, closing the laboratory sample container can be removed after the new ID information has been assigned to the laboratory sample container.

According to an embodiment, the laboratory sample container can comprise/contain a laboratory sample. The laboratory sample can be analyzed based on the ID information. For example, the different types of analyses performed on the laboratory sample may be determined based on the ID information.

According to an embodiment, the laboratory sample containers can be provided to the laboratory sample container handling system in a bulk commodity. The laboratory sample containers can be singularized before being further processed. The new ID information can be assigned to the laboratory sample containers after such as, for example, immediately after, the laboratory sample containers have been singularized.

The laboratory sample container handling system is also presented. The laboratory sample container handling system can comprise a reader configured to read ID information being assigned to a laboratory sample container provided to the laboratory sample container handling system, an ID changer configured to assign a new ID information to the laboratory sample container, and a control unit coupled to the reader and to the ID changer and configured to control the laboratory sample container handling system such that a method as described above is performed.

According to an embodiment, the laboratory sample container handling system can comprise a middleware unit configured to check if the read ID information is unique or not unique within the laboratory sample container handling system and, if the read ID information is not unique within the laboratory sample container handling system, to assign a new ID information to the laboratory sample container. The new ID information can be unique within the laboratory sample container handling system.

According to an embodiment, the reader can be a barcode reader.

According to an embodiment, the reader can be a RFID reader.

According to an embodiment, the ID changer can be a printer such as, for example a label printer.

According to an embodiment, the ID changer can be a RFID reader configured to reprogram an electronic storage of a RFID tag.

A laboratory automation system is also presented. The laboratory automation system can comprise the laboratory sample container handling system as described above and a number, e.g. between 1 and 100, of laboratory stations configured to process a laboratory sample contained in the laboratory sample container based on the ID information.

Referring initially to FIG. 1, FIG. 1 schematically depicts a laboratory automation system 1000 comprising a laboratory sample container handling system 100.

A control unit 9 can control the operation of the laboratory automation system 1000.

The laboratory sample container handling system 100 can be configured to handle or process laboratory sample containers 1 containing laboratory samples 6 obtained from patients 30 during sample preparation 40. The laboratory samples 6 may be e.g. blood samples or any kind of body fluids, and the like. The laboratory sample containers 1 can be closed by caps 5 after the laboratory samples 6 have been filled into the laboratory sample containers 1.

Each laboratory sample container 1 can comprise an assigned ID information 2. The ID information 2 may e.g. be embodied as a barcode 3 printed on a label 4 attached to the laboratory sample container 1. Alternatively, or additionally, the ID information 2 may e.g. be embodied as a value stored in a RFID tag 10 attached to the laboratory sample container 1.

After sample preparation, the laboratory sample containers 1 can be collected in a container 50. The laboratory sample containers 1 collected in the container 50 can be fed into a bulk loading device 20.

A reader 7 can be configured to read the ID information 2 assigned to a laboratory sample container 1 provided to the bulk loading device 20. The reader 7 may e.g. be embodied as a barcode reader or a RFID reader.

The bulk-loading device 20 can be configured to singularize the laboratory sample containers 1 and to provide the singularized laboratory sample containers 1 to a transport device 60.

After the laboratory sample containers 1 have been singularized, the reader 7 can read the ID information 2 assigned to a laboratory sample container 1 and can provide the read ID information 2 to the control unit 9.

The control unit 9 can then check if the read ID information 2 is unique or not unique within and laboratory automation system 1000 (and consequently in the laboratory sample container handling system 100).

If the read ID information 2 is not unique within the laboratory automation system 1000, the control unit 9 can initiate that a new ID information 2 be assigned to the laboratory sample container 1. The new ID information 2 can be unique within the laboratory automation system 1000.

The laboratory sample container 1 can be further processed after the new ID information 2 has been assigned to the laboratory sample container 1 based on the new ID information 2.

If the read ID information 2 is unique within the laboratory automation system 1000, the ID information 2 can remain unchanged.

Changing the ID information 2 can be performed by an ID changer 8 configured to assign a new ID information 2 to the laboratory sample container 1. The ID changer 8 may e.g. be embodied as a label printer or as a RFID reader.

If the ID changer 8 is embodied as a label printer, the new ID information 2 can be assigned to the laboratory sample container 1 by attaching a new label 4 to the laboratory sample container 1. A barcode 3 representing the new ID information 2 can be printed on the new label 4 by the label printer.

If the ID changer 8 is embodied as a RFID reader, the new ID information 2 can be assigned to the laboratory sample container 1 by overwriting the stored value by the new ID information 2.

After checking and replacing the ID information 2, if necessary, the cap 5 closing the laboratory sample container 1 can be removed and the open laboratory sample container 1 can be provided to the transport device 60.

The laboratory automation system 1000 can comprise a number of laboratory stations 12 configured to process a laboratory sample 6 contained in the laboratory sample container 1 based on the ID information 2.

The laboratory sample container handling system 100 may comprise a middleware unit 11, which may be part of the control unit 9 or may be embodied in data communication with the control unit 9.

The middleware unit 11 may be configured to check if the read ID information 2 is unique or not unique within the laboratory automation system 1000 and, if the read ID information 2 is not unique within the laboratory automation system 1000, to assign a new ID information 2 to the laboratory sample container 1. The new ID information 2 can be unique within the laboratory automation system 1000.

A laboratory sample container may be relabeled with a unique sample ID or ID information based on information provided by the middleware unit 11. The provided information may comprise information, if relabeling must be done or not, and optionally the new and unique label-ID or ID information.

The process may be as follows, first, sample tubes 1 closed by caps 5 can be thrown into the bulk loader device 20. The sample tube 1 can then be detected and identified, for example, by a barcode 3 and/or cap color. The bulk loader device 20 can send a relabeling request to the middleware unit 11. The middleware unit 11 can reply a) if relabeling is required and/or b) optionally containing the new unique ID information 2, The he bulk loader device 20 can bring the laboratory sample container 1 to the ID changer 8 or relabeling station where a new label 4 with the unique ID information 2 can be put, for example, on top of the existing label 4, providing there is a complete coverage of the old label 4. The laboratory sample container 1 can then be forwarded towards the laboratory stations 12

The present disclosure can enable the processing of duplicate ID information and aliquots on an automated laboratory system. The present disclosure can overcome the current relation between barcode and cap color by providing a unique label or ID information to ensure that the removal of the cap can be possible and the sample can still be distinguished from all others on the automated laboratory system even if the sample leaves the automation and is reinserted into automation again at a later point in time.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method of handling laboratory sample containers by a laboratory sample container handling system, the method comprising:
   providing a laboratory sample container comprising an assigned ID information to the laboratory sample container handling system;
   reading the assigned ID information;
   checking if the read ID information is unique or not unique within the laboratory sample container handling system; and
   if the read ID information is not unique within the laboratory sample container handling system, assigning a new ID information to the laboratory sample container,
   wherein the new ID information is unique within the laboratory sample container handling system,
   wherein the laboratory sample containers are provided to the laboratory sample container handling system in a bulk commodity,
   wherein the laboratory sample containers are singularized, and
   wherein the new ID information is assigned to the laboratory sample containers immediately after the laboratory sample containers have been singularized.

2. The method according to claim 1, wherein the ID information is embodied as a barcode printed on a label attached to the laboratory sample container.

3. The method according to claim 2, wherein the assignment of the new ID information to the laboratory sample container is performed by attaching a new label to the laboratory sample container, wherein a barcode representing the new ID information is printed on the new label.

4. The method according to claim 1, wherein the ID information is embodied as a value stored in a RFID tag attached to the laboratory sample container.

5. The method according to claim 4, wherein the assignment of the new ID information to the laboratory sample container is performed by overwriting the stored value by the new ID information.

6. The method according to claim 1, wherein the laboratory sample container is further processed after the new ID information has been assigned to the laboratory sample container based on the new ID information.

7. The method according to claim 1, wherein a cap closing the laboratory sample container is removed after the new ID information has been assigned to the laboratory sample container.

8. The method according to claim 1, wherein the laboratory sample container comprises a laboratory sample, wherein the laboratory sample is analyzed based on the ID information.

9. A laboratory sample container handling system, the laboratory sample container handling system comprising:
   a reader configured to read ID information assigned to a laboratory sample container provided to the laboratory sample container handling system;
   an ID changer configured to assign a new ID information to the laboratory sample container; and
   a control unit coupled to the reader and to the ID changer and configured to control the laboratory sample container handling system such that the method according to claim 1 is performed.

10. The laboratory sample container handling system according to claim 9, further comprises,
    a middleware unit configured to check if the read ID information is unique or not unique within the laboratory sample container handling system and, if the read ID information is not unique within the laboratory sample container handling system, to assign a new ID information to the laboratory sample container, wherein the new ID information is unique within the laboratory sample container handling system.

11. The laboratory sample container handling system according to claim 9, wherein the reader is a barcode reader.

12. The laboratory sample container handling system according to claim 9, wherein the reader is a RFID reader.

13. The laboratory sample container handling system according to claim 9, wherein the ID changer is a printer.

14. The laboratory sample container handling system according to claim 9, wherein the ID changer is a RFID reader.

15. A laboratory automation system, the laboratory automation system comprising:
    a laboratory sample container handling system according to claim 9; and
    a number of laboratory stations configured to process a laboratory sample contained in the laboratory sample container based on the ID information.

* * * * *